United States Patent
Eline et al.

(10) Patent No.: US 9,826,202 B2
(45) Date of Patent: Nov. 21, 2017

(54) MOBILE APPRATUS, IN PARTICULAR A ROTARY-WING DRONE, PROVIDED WITH A VIDEO CAMERA DELIVERING SEQUENCES OF IMAGES DYNAMICALLY CORRECTED FOR THE WOBBLE EFFECT

(71) Applicant: PARROT DRONES, Paris (FR)

(72) Inventors: Pierre Eline, Arnouville les Gonesse (FR); Eng Hong Sron, Paris (FR)

(73) Assignee: Parrot Drones, Paris (FR)

( * ) Notice: Subject to any disclaimer, the term of this patent is extended or adjusted under 35 U.S.C. 154(b) by 297 days.

(21) Appl. No.: 14/855,287

(22) Filed: Sep. 15, 2015

(65) Prior Publication Data
US 2016/0105648 A1    Apr. 14, 2016

(30) Foreign Application Priority Data
Oct. 10, 2014  (FR) .................. 14 59720

(51) Int. Cl.
*H04N 7/18* (2006.01)
*H04N 5/232* (2006.01)
(Continued)

(52) U.S. Cl.
CPC .......... *H04N 7/185* (2013.01); *B64C 39/024* (2013.01); *B64D 47/08* (2013.01); *G06F 3/0346* (2013.01);
(Continued)

(58) Field of Classification Search
CPC .............. H04N 7/185; H04N 5/23258; H04N 5/23264; H04N 5/23267; H04N 5/3532;
(Continued)

(56) References Cited

U.S. PATENT DOCUMENTS

2004/0056963 A1    3/2004  Ishikawa
2008/0030587 A1    2/2008  Helbing
(Continued)

*Primary Examiner* — Tuan Ho
(74) *Attorney, Agent, or Firm* — Haverstock & Owens LLP (57) ABSTRACT

The apparatus comprises a camera (10) with a digital sensor read by a mechanism of the rolling shutter type delivering video data ($S_{cam}$) line by line. An exposure control circuit (22) adjusts dynamically the exposure time ($t_{exp}$) as a function of the level of illumination of the scene that is captured. A gyrometer unit (12) delivers a gyrometer signal ($S_{gyro}$) representative of the instantaneous variations of attitude ($\phi$, $\theta$, $\psi$) of the camera, and a processing circuit (18) that receives the video data ($S_{cam}$) and the gyrometer signal ($S_{gyro}$) delivers as an output video data processed and corrected for artefacts introduced by vibrations specific to the apparatus. An anti-wobble filter (24) dynamically modifies the gain of the gyrometer signal as a function of the exposure time ($t_{exp}$), so as to reduce the gain of the filter when the exposure time increases, and vice versa.

8 Claims, 4 Drawing Sheets

(51) Int. Cl.
*H04N 5/353* (2011.01)
*B64C 39/02* (2006.01)
*B64D 47/08* (2006.01)
*G06F 3/0346* (2013.01)

(52) U.S. Cl.
CPC ..... *H04N 5/23258* (2013.01); *H04N 5/23264* (2013.01); *H04N 5/23267* (2013.01); *H04N 5/3532* (2013.01); *B64C 2201/123* (2013.01)

(58) Field of Classification Search
CPC . B64C 39/024; B64C 2201/123; B64D 47/08; G06F 3/0346
See application file for complete search history.

(56) References Cited

U.S. PATENT DOCUMENTS

| | | |
|---|---|---|
| 2011/0129166 A1 | 6/2011 | Nishiyama |
| 2012/0242847 A1 | 9/2012 | Narita |
| 2013/0044230 A1 | 2/2013 | Zhou |
| 2014/0267778 A1* | 9/2014 | Webb .................. H04N 5/2328 348/169 |
| 2014/0267809 A1* | 9/2014 | Tsubaki ............. H04N 5/23287 348/208.6 |
| 2015/0103194 A1* | 4/2015 | Takeuchi ........... H04N 5/23287 348/208.6 |

\* cited by examiner

MOBILE APPRATUS, IN PARTICULAR A ROTARY-WING DRONE, PROVIDED WITH A VIDEO CAMERA DELIVERING SEQUENCES OF IMAGES DYNAMICALLY CORRECTED FOR THE WOBBLE EFFECT

The invention relates to the processing of digital images captured by a camera on board a mobile apparatus. in particular a motorized flying device such a drone.

The invention advantageously applies to the images collected by the front camera of a rotary-wing drone such as a quadricopter. Atypically example of such a drone is the AR.Drone 2.0 of Parrot SA, Paris, France, which is a quadricopter equipped with a series of sensors (accelerometers, 3-axis gyrometers, altimeter), a front camera capturing an image of the scene towards which the drone is directed, and a vertical-view camera capturing an image of the overflown ground. The drone is provided with multiple rotors driven by respective motors that can be controlled in a differentiated manner so as to pilot the drone in attitude and speed.

Various aspects of this drone are described in the WO 20101061099 A2, EP 2 364 757 A1 or EP 2 613 214 A1 (Parrot SA).

The front video camera can be used for an "immersive mode" piloting, i.e. where the user uses the image of the camera in the same way as if he was himself on board the drone.

It may also serve to capture sequences of images of a scene towards which the drone is directed. The user can hence use the drone in the same way as a camera or a camcorder that, instead of being held in hand, would be borne by the drone. The collected images can be recorded then broadcast, put online on video sequence hosting web sites, sent to other Internet users, shared on social networks, etc.

These images being intended to be recorded and communicated, it is desirable that they have the less defects possible, in particular defects caused by the behaviour of the drone, which may generate oscillations, deformations or other untimely artefacts of the image captured by the camera.

Such defects may be acceptable in an "immersive piloting" configuration. But, if the matter is to use the drone as a mobile video camera to capture sequences that will be recorded and reproduced latter, these defects are extremely hampering, so that it is desirable to reduce them to a minimum. The invention aims especially to eliminate the defect known as wobble, which is an effect of blurring and deformation of the image. This effect appears in the presence of high-frequency and low-amplitude vibrations. typically the vibrations of the motors, transmitted to the camera support, which have for result to deform the straight lines with appearance of undulations and formation of waves on the image. This effect, even if it is not very pronounced, is very quickly perceptible by sight, so that it deteriorates very rapidly the visual quality of the image.

This particular artefact is due to the mechanism of the rolling-shutter type (and not global-shutter type) used by the sensors of the cameras such as those that are on board the drones, where the lines constituting the image are not acquired at the same time for all the pixels of the image, but one after the other. The vibrations occurring during the capture of an image therefore generate in the image deformations that are not the same from one line to the following one, hence the appearance of the undulations.

The line-by-line correction ("intra-line correction) of the wobble effect may be performed using the measurements of the gyrometers, which deliver a signal that is representative of the instantaneous rotations of the drone and hence of the camera in the three axes, including the fast variations due to the vibrations. The application of an inverse transform of the gyrometer measurement allows to compensate to some extent for the wobble effect, from the moment that the attitude of the drone can be acquired accurately for each of the lines, and synchronously with the sensor of the camera.

A technique of this type is described in particular in the application FR 14 56302 of Jul. 2, 2014, "Drone à voilure toumante muni d une caméra vidéo délivrant des séquences d images stabilisées", in the name of the Applicant.

The US 2012/0242847 A1 describes a technique of same nature, applied to a rolling-shutter video camera, for correcting deformations produced under the effect of the movements or tremors of the user holding the camera at arm's length. The camera being provided with gyrometer sensors, it is possible to evaluate the instantaneous rotations of the sensor and to compensate for these movements, in real time, by a suitable electronic processing of the image signals delivered by the sensor.

That said, as will be explained more precisely in the detailed description hereinafter, this method of wobble compensation using the gyrometer signal is liable to produce in certain conditions over-corrections generating new artefacts, with for consequence that the corrected image is paradoxically more degraded than the raw image obtained before any correction. The starting point of the invention is the observation that this phenomenon is linked to the exposure time of the camera and occurs only with long exposure times, corresponding to dark scenes.

Indeed, when the exposure time is close to the period of vibration undergone by the camera (i.e. the vibration that generates the wobble that is desired to be reduced), the wobble is naturally filtered by the long exposure time of the camera. The raw image has then a blurring by motion but a little or no undulation. But if an inverse correction coming from the gyrometer signal—which reflects the effect of the vibration on the camera but does not take into account the effect of filtering by the long exposure time—is applied, then this inverse correction makes appear on the image, in addition to a slight blurring by motion, an undulation that didn't exist on the raw image.

The basic principle of the invention consists in inserting a filter in the chain of stabilization of the image, between the circuit delivering the gyrometer signal and the distortion correction circuit, so that the gyrometer signal, reflecting the instantaneous rotations of the camera due to the vibrations, is filtered with a transfer function depending of the exposure time of the camera for the current image. For each image, a filter will be generated with a cut-off frequency varying inversely with the exposure time, so as to progressively suppress from the correction signal (gyrometer signal) the movements of the camera naturally filtered due to the increasing exposure time, and hence not to introduce false corrections degrading the result.

More precisely, the invention proposes a mobile apparatus, in particular a motorized flying device such as a drone, comprising in a manner known by itself, in particular from the above-mentioned US 2012/0242847 A1, a camera comprising a lens, a digital sensor on which is formed an image of a scene during a given exposure time, and a mechanism for reading the sensor of the rolling-shutter type delivering as an output, line by line, video data, as well as an exposure control circuit, comprising a servomechanism adapted to dynamically adjust the exposure time as a function of the level of illumination of the scene that is captured. A gyrometer unit delivers a gyrometer signal representative of the instantaneous variations of the attitude of the mobile apparatus. An image processing circuit, comprising an anti-wobble filter, receives as an input the video data and the gyrometer signal and delivers as an output video data processed and corrected for artefacts introduced by vibrations specific to the mobile apparatus.

Characteristically of the invention, the anti-wobble filter dynamically modifies the gain of the gyrometer signal applied at the input of the image processing circuit as a function of the exposure time determined by the exposure control circuit, so as to reduce the gain of the filter when the exposure time increases, and vice versa.

According to various advantageous subsidiary characteristics:
  the gain variation law of the filter is a monotonic variation law, which can be bound between a maximum gain of one and a minimum gain of zero;
  the anti-wobble filter is a digital filter adapted to generate, for a given image, a low-pass Butterworth filter whose order is predefined and whose cut-off frequency varies as a function of the exposure time determined for said given image;
  the law of variation of the cut-off frequency $F_c$ of the Butterworth filter as a function of the exposure time $t_{exp}$ is a law of the type $F_c = 1/2 \cdot t_{exp}$;
  the digital filter is applied twice to the gyrometer signal, in the forward direction and in the return direction;
  the camera delivers as an output the video data for the duration of an acquisition window, and the anti-wobble filter is applied, for a given image, for the duration of a processing window starting before the window of acquisition of this image, and ending after the window of acquisition of the image.

An exemplary embodiment of the invention will now be described, with reference to the appended drawings in which the same references denote identical or functionally similar elements throughout the figures.

Figure 1A:
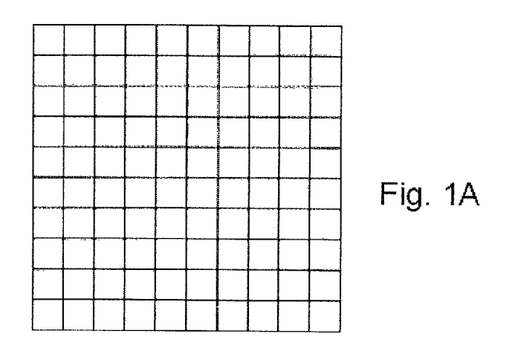
FIGS. 1a to 1c illustrate the artefacts of the jelly and wobble type, which can be observed on the image of a checkerboard, before the application of any corrective filtering.

In FIG. 1 are illus rated the deformations referred to as jelly and wobble, which can be observed on the image of a checkerboard shown in FIG. 1a.

These artefacts are specific to a sensor of the rolling-shutter type (and not global-shutter type), where the lines constituting the image are not acquired at the same time for all the pixels of the image, but successively line after line (or group of lines after group of lines), as the scanning of the sensor goes along in the direction $D_B$, perpendicular to the lines C. The movements of the drone and the vibrations occurring during the capture of an image therefore generate elsewhere in the image deformations that won't be the same from one line to the following one.

Figure 1B:
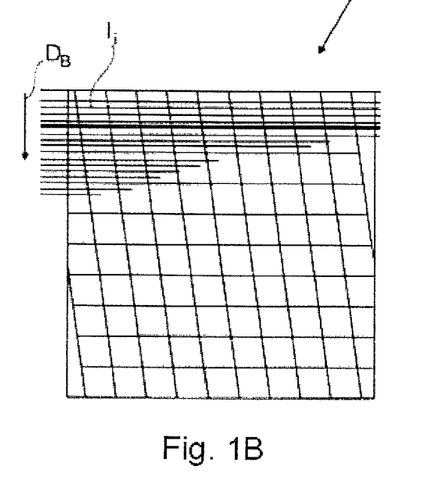

The jelly effect, visible in FIG. 1b, appears in the presence of movements of the camera of high amplitude but relatively low frequency, for example in the presence of important rotations of the drone: when the latter rotates, between the beginning and the end of the exploration of the sensor by the rolling shutter, the image is displaced by several pixels (in the example of FIG. 1b, by about one square of the checkerboard between the top and the bottom of the image). This phenomenon can be compensated for by adapting at each line $l_i$ of the image a suitable offset as the scanning $D_B$ of the sensor goes along, this line-by-line correction allowing to cancel the jelly artefact introduced by the fast rotation of the drone.

Figure 1C:
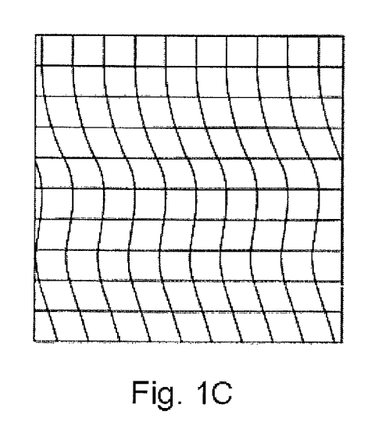

FIG. 1c illustrates the other type of artefact, called "wobble effect", which is the effect to which the present invention relates.

Unlike the jelly effect, which is a low-frequency and high-amplitude effect caused by the rotations of the drone to move, the wobble effect is mainly caused by the vibrations of the motor, which introduce oscillations of high-frequency (typically of the order of 120 Hz) and low-amplitude.

The wobble effect is partially corrected by a suitable mechanical damping of the camera support allowing to filter the vibrations of the motor, as described for example in the WO 2011/058255 A1 (Parrot SA).

This mechanical filtering is, in practice, not sufficient and the residues of the wobble effect must be eliminated, which may be performed using measurements delivered by the inertial unit of the drone, representative of the instantaneous rotations of the drone caused by the vibrations, and by applying the corrections line by line.

Indeed, the gyrometers of the inertial unit allow to have an indication of the precise attitude of the drone for each of the lines, hence allowing an "intra-image" correction, line by line, so as to readjust the successive lines relative to each other in order to reproduce an image that is the closest possible to the captured scene, i.e. the checkerboard of FIG. 1a in the present example.

The above-mentioned French application 14 56302 of Jul. 2, 2014, describes such a technique for correcting the jelly and wobble effects using the signals delivered by the gyrometers of the drone inertial unit, technique that will be described hereinafter with reference to FIG. 4.

This technique is however not devoid of drawbacks in certain circumstances, as will be now explained with reference to FIGS. 2 and 3.

Figures 2A, 2B:
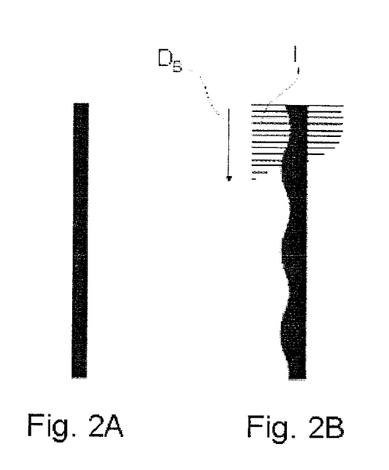
FIGS. 2a to 2d illustrate the images of a high-contrast vertical bar. obtained by application of various distortion correction techniques, with a short exposure time.
Figure 2C:
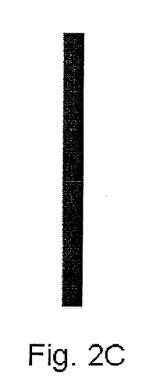
Figure 2D:
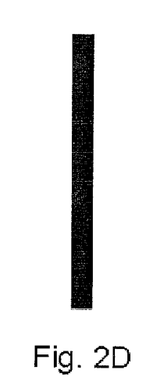

In FIG. 2, a high-contrast scene with a straight line has been simulated, with:
  FIG. 2a. the original scene, i.e. the actual representation serving as a reference;
  FIG. 2b, the image obtained on a rolling-shutter sensor of a camera filming the scene of FIG. 2a, and subjected to an important vibration: the initial straight line appears curled due to the fact that the lines $l_i$ are not acquired simultaneously, but scanned successively in the direction $D_B$, according to the technique that is characteristic of a rolling-shutter camera;
  FIG. 2c, the image of FIG. 2b after correction by application of the inverse movement of the vibration, as measured by gyrometers integral with the camera: as can be observed, the undulation has disappeared, to the only cost of a slight thickening of the line, that is visually not hampering for the perception of the image;

FIG. 2d, the image of the scene of FIG. 2a that would have been obtained on a global-shutter sensor of a camera filming the scene of FIG. 2a; the lines of the sensor are herein read by blocks, simultaneously, and are hence not subjected to the wobble phenomenon. This type of image is the ideal to which it will be searched to come closer.

The representations of FIG. 2 have been made with a very short exposure time, of the order of 1 ms, corresponding to imaging conditions typical of those which can be met outside by sunny weather.

FIG. 3 illustrates the results that would be obtained with a longer exposure time, for example 8 ms, close to the period of the vibration undergone by the camera (i.e. 8.33 ms for a vibration of 120 Hz).

Figure 3A:
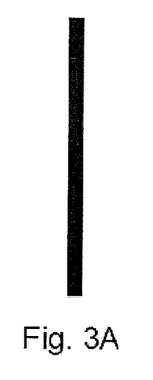
FIGS. 3a to 3d illustrate the same respective images as those of FIGS. 2a to 2d, but with a long exposure time, close to the period of the vibrations undergone by the camera.
Figure 3B:
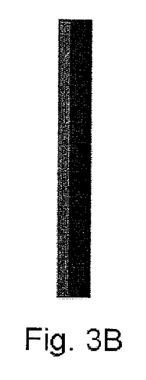

It can be observed in FIG. 3b that the wobble has been naturally filtered by the camera: the undulation has disappeared and the artefact occurs only as a progressive blurring, which is not visually too hampering. This result is moreover perfectly comparable, as illustrated in FIG. 3d, to what would have been obtained with a global-shutter sensor, which would also show a blurring by moving at the contrast area.

Figure 3C:
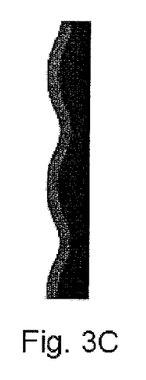
Figure 3D:
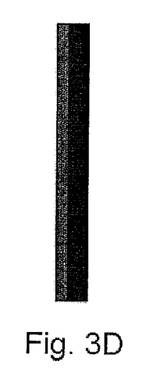

On the other hand, as illustrated in FIG. 3c, the image on which the inverse movement undergone by the camera and measured by the gyrometer has been applied gives a result of bad quality, very far from the ideal constituted by the image of FIG. 3d, which would have been obtained with a global-shutter sensor.

This example shows the limits of the anti-wobble correction by application of an inverse gyrometer signal: of course, the gyrometers measure all the movements undergone by the camera during the scanning of the sensor image but, according to the frequency of these movements and the exposure time, these movements are liable to generate more or less visible deformations, which have for consequence to over-correct certain movements and to generate new artefacts, By applying a correction, it is hence paradoxically obtained an image of less quality (FIG. 3c) than if another correction had been applied (FIG. 3b).

That is the problem that the present invention aims to solve.

Figure 4:
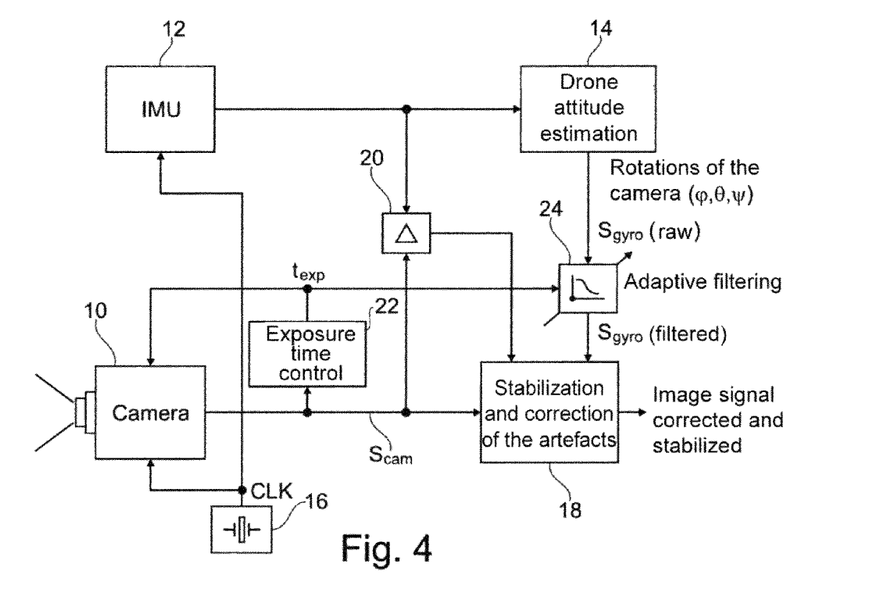
FIG. 4 illustrates, as a block-diagram, the different elements of correction and filtering of the artefacts of the wobble type, according to the invention.

FIG. 4 illustrates, as a block-diagram, the different elements of an image processing circuit allowing to correct the wobble effect on the image signal $S_{cam}$ delivered by a camera 10 comprising a sensor of the rolling-shutter type.

This camera is subjected to angular displacements, of high amplitude and low frequency (displacement of the drone). as well as low amplitude and high frequency (vibration of the motors). These movements undergone by the camera are measured by an inertial unit 12 whose measurements are applied to a circuit 14 for estimating the drone attitude, delivering a gyrometer signal $S_{gyro}$ representative of the instantaneous rotations of the drone and hence of the camera, the inertial unit 12 and the camera 10 being mechanically integral to each other. These rotations are given by the pitch angle $\phi$, the roll angle $\theta$ and the yaw angle $\psi$, describing the inclination of the drone in the three dimensions with respect to a fixed terrestrial reference system (Euler angle).

The gyrometer signal $S_{gyro}$ is applied to a circuit 18 for stabilizing and correcting the artefacts of the image signal $S_{cam}$, to obtain as an output a corrected and stabilized image signal that can then be transmitted to the user to be visualized on a screen. recorded in a digital memory, etc.

The camera 10 and the inertial unit 12 are piloted by a common clock circuit 16, the respective working frequency of the inertial unit and the camera being sub-multiples of the frequency CLK of this clock 16. In other words, the camera 10 and the inertial unit 12 are configured so that $F_{gyro}=K.F_{cam}$, $F_{gyro}$ being the acquisition frequency of the gyrometers (typically, $F_{gyro}=990$ Hz), $F_{cam}$ being the frequency of acquisition of the images by the video camera (typically , $F_{cam}=30$ Hz), and K being a positive integer (typically, K=33). The fact that K is an integer and that the basis clock is the same for the gyrometers and the camera ensures that there will always be K samples of the gyrometer signal $S_{gyro}$ per image $S_{cam}$, with no drift, the angle measurements always falling at the same instant of time.

However, if this mechanism ensures that the signal $S_{gyro}$ delivered by the gyrometer sensors and the signal $S_{cam}$ delivered by the camera are synchronous, it gives no guarantee about the phase concordance of these signals. To guarantee a perfect synchronisation, a hardware component 20 measures the time interval Δ between the gyrometer $S_{gyro}$ and video $S_{cam}$ signals with a great accuracy. The common clock 16 and the phase-shift measurement hardware circuit 20 hence allow to link the gyrometer and video signals in time with a very high accurateness, to within a clock cycle. It will be noted that a single measurement is sufficient, because the clocks have been set so as not to drift.

This configuration is that described in the above-mentioned application FR 14 56302 but, as shown with reference to FIGS. 2 and 3, in the case of long exposure time, it does not allow to obtain a satisfying correction of the wobble but, on the contrary, introduces new artefacts by over-correction effect.

For that purpose, the present invention proposes to dynamically modulate the effect of the gyrometer correction, as a function of the exposure time of the image.

The exposure time $t_{exp}$ is determined, image by image, by an exposure control circuit 22, comprising a servomechanism allowing to dynamically adjust the exposure time according to the level of illumination of the scene captured by the camera 10. As a function of this level of illumination, determined by analysis of the signal $S_{cam}$, the circuit 22 pilots the camera so as to vary the exposure time in order to maintain the level of illumination in the best conditions of reproduction of the image by the sensor.

Characteristically, the invention provides to insert between the inertial unit 12 and the digital image correction circuit 18 a filter 24 that is dynamically controlled as a function of the exposure time $t_{exp}$ determined by the circuit 22. This filtering is an adaptive filtering with, for each image, the generation of a digital filter whose cut-off frequency will vary inversely with the exposure time. so as to all the more attenuate the gyrometer signal—and hence the correction that the latter introduces in the image—that the exposure time is high, so as not to introduce a false correction degrading the result.

It will now be explained, with reference to FIG. 5, the way the transfer function of this filter is defined.

In a first time, the optimum attenuation to be apply to the data $S_{gyro}$ coming from the gyrometer is determined experimentally, for different exposures, as a function of the frequency of the propellers (in an example of implementation, in fixed point, the propellers rotate at 120 Hz, and that is this value of frequency that will be used to adjust the characteristics of the dynamic filter).

For that purpose, the drone is caused to fly in front of a test chart, the result produced for different values of attenuation of the signal $S_{gyro}$ is examined, and the amplitude of the undulations of the image is measured: when this amplitude is minimum, it is considered that the optimum gain value $A_i$ has been found.

Figure 5:
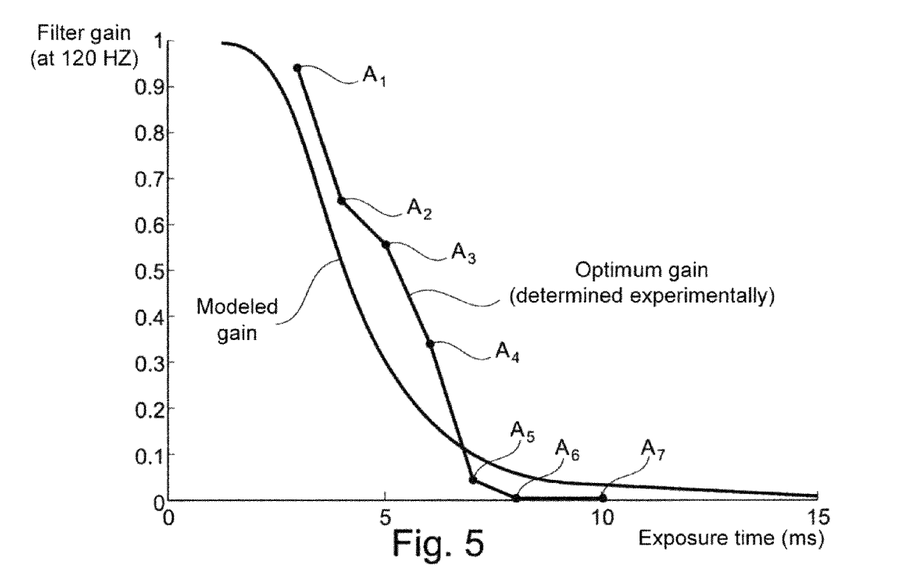
FIG. 5 illustrates the optimized gain/exposure time characteristic for the characteristic vibration frequency undergone by the camera, as experimentally recorded and approximated by a mathematical function allowing to model this optimum characteristic.

The different values $A_1, A_2 \ldots A_7$ recorded for increasing exposure times of 3 ms, 4 ms . . . 10 ms give the optimum gain curve shown in FIG. 5.

As can be seen, for exposure times lower than 3 ms, the gain is equal to one, i.e. the totality of the signal $S_{gyro}$ reflecting the vibration of the propellers is applied to the artefact correction circuit 18, with no filtering. On the other hand, for exposure times equal to or higher than 8 ms, the signal $S_{gyro}$ is totally filtered, i.e. the gyrometer signal is not taken into account at all to correct the artefacts. Between both, for an average exposure time of 5 ms, the best gain is of about 0.5, which means that the amplitude of the correction signal $S_{gyro}$ must be attenuated by a half.

The following step consists in modelling the characteristic experimentally recorded, i.e. determining the law of generation of the digital filter that will be applied to each image.

It may advantageously be chosen a filter of the Butterworth type, for the quality of its gain response, which is as constant as possible in the pass-band.

To make up for the phase-shift problems, the filter is applied twice to the gyrometer data $S_{gyro}$, first in the forward direction, then in the return direction. More precisely:

- the gyrometer signal produces a series of samples $e_0, e_1 \ldots e_n$;
- the filter is applied a first time to this sample, giving filtered values $F_0, F_1 \ldots F_n$;
- the order of these values is inverted, giving a sequence $F_n \ldots F_1, F_0$;
- the filter is applied a second time, producing new filtered values $F'_4 \ldots F'_1, F'_1$; and
- the order of these samples is inverted to give the values $F'_0, F'_1 \ldots F'_n$, which will be finally used by the artefact correction circuit (filtered signal $S_{gyro}$).

This double filtering requires to have samples of the raw gyrometer signal $S_{gyro}$ before and after the capture of the image. The anti-wobble processing will hence be delayed by a few milliseconds, the time to cumulate enough samples of the gyrometer signal in a buffer.

The synthesis of a low-pass Butterworth filter involves two input parameters:

- its cut-off frequency, beyond which the signals have to be attenuated, and
- its order, which determines the width of the transition band between the passband and the cut band, i.e. the more or less abrupt character of this transition.

By choosing an order 2 and fixing for the cut-off frequency a law of the type:

$$F_c = 1/2 . t_{exp},$$

$F_c$ being the cut-off frequency of the Butterworth filter, and $t_{exp}$ being the current value of the exposure time, the continuous curve of the modelled gain illustrated in FIG. 5 is obtained, which approximates in a perfectly suitable manner the characteristic experimentally recorded.

Figure 6:
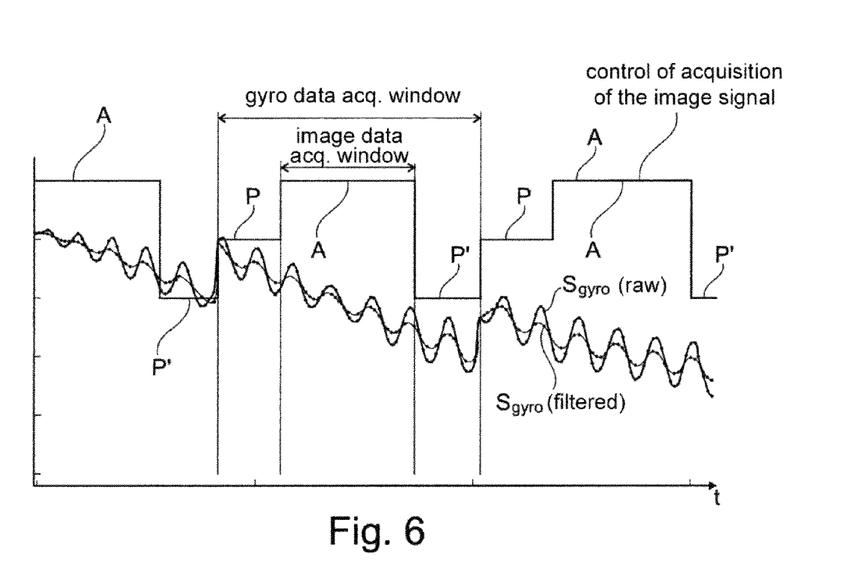
FIG. 6 is a chronogram showing the action of the dynamic filter of the invention, in the case of an image captured with a short exposure time.
Figure 7:
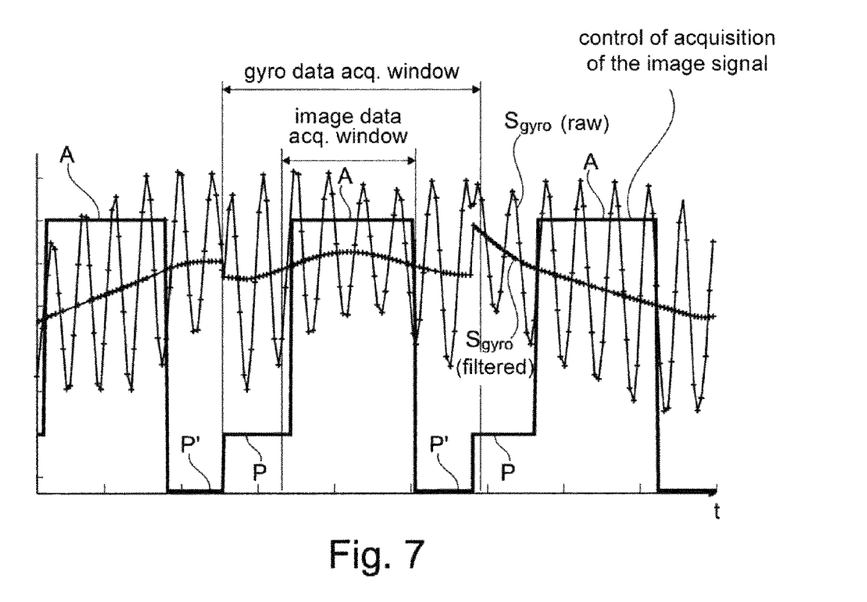
FIG. 7 is similar to FIG. 6, for a long exposure time.

FIGS. 6 and 7 are chronograms showing the action of the dynamic filter of the invention, in the case of an image captured with a short exposure time and with a long exposure time, respectively.

On these figures. the area A corresponds to the image acquisition window, and the curve "$S_{gyro}$ (raw)" corresponds to the gyrometer signal before application of the filtering.

To operate the correction according to the invention, it is required to collect an history of the samples of the gyrometer signal on a wider window (anterior samples P and posterior samples P') than the window A corresponding to the only data of the image.

FIG. 6 illustrates a case where the exposure time is short, with the filter partially applied so as to reduce the effect of the vibrations. By comparing the two curves "$S_{gyro}$ (raw)" and "$S_{gyro}$ (filtered)", it may be observed that the low-frequency undulations have been preserved and the high-frequency ones are partially attenuated, the whole with no phase-shift.

FIG. 7 is similar to FIG. 6, in the case of a very long exposure time: in this case, the high frequency of the gyrometer signal is totally suppressed by the filter. On the other hand, the low-frequency variations are preserved. These slow variations, representative of a jelly effect, will be able to be corrected by a conventional technique of adjustment line by line of the successive lines of the image.

The invention claimed is:

1. A mobile apparatus, in particular a motorized flying device such as a drone, including:
   - a camera comprising a lens, a digital sensor on which is formed an image of a scene during a given exposure time ($t_{exp}$), and a mechanism for reading the sensor of the rolling-shutter type delivering as an output. line by line, video data ($S_{cam}$);
   - an exposure control circuit, comprising a servomechanism adapted to dynamically adjust the exposure time ($t_{exp}$) as a function of the level of illumination of the scene that is captured;
   - a gyrometer unit adapted to deliver a gyrometer signal ($S_{gyro}$) representative of the instantaneous variations of the attitude ($\phi, \theta, \psi$) of the mobile apparatus; and
   - an image processing circuit, comprising an anti-wobble filter, receiving as an input the video data ($S_{cam}$) and the gyrometer signal ($S_{gyro}$), and delivering as an output video data processed and corrected for artefacts introduced by vibrations specific to the mobile apparatus, characterized in that the anti-wobble filter is adapted to dynamically modify the gain of the gyrometer signal applied at the input of the image processing circuit as a function of the exposure time ($t_{exp}$) determined by the exposure control circuit, so as to reduce the gain of the filter when the exposure time increases, and vice versa.

2. The mobile apparatus of claim 1, wherein the gain variation law of the filter is a monotonic variation law.

3. The mobile apparatus of claim 2, wherein the gain variation law of the filter is a variation law that is bound between a maximum gain of one and a minimum gain of zero.

4. The mobile apparatus of claim 2, wherein the anti-wobble filter (24) is a digital filter adapted to generate, for a given image, a low-pass Butter-worth filter whose order is predefined and whose cut-off frequency ($F_c$) varies as a function of the exposure time ($t_{exp}$) determined for said given image.

5. The mobile apparatus of claim 4, wherein the law of variation of the cut-off frequency ($F_c$) of the Butterworth filter as a function of the exposure time ($t_{exp}$) is a law of the type $F_c = 1/2 . t_{exp}$.

6. The mobile apparatus of claim 4, wherein the digital filter is applied twice to the gyrometer signal, in the forward direction and in the return direction.

7. The mobile apparatus of claim 1, wherein the camera is adapted to deliver as an output the video data for the duration of an acquisition window (A),     and wherein means are provided. which are adapted to apply the anti-wobble filter for a given image for the duration of a processing window (P, A, P') starting before the window of acquisition of this image.

8. The mobile apparatus of claim 7, wherein said means are adapted to apply the anti-wobble filter for the duration of said processing window (P, A, P') ending after the window of acquisition of the image.

\* \* \* \* \*

UNITED STATES PATENT AND TRADEMARK OFFICE
CERTIFICATE OF CORRECTION

PATENT NO. : 9,826,202 B2
APPLICATION NO. : 14/855287
DATED : November 21, 2017
INVENTOR(S) : Pierre Eline et al.

Page 1 of 1

It is certified that error appears in the above-identified patent and that said Letters Patent is hereby corrected as shown below:

In the Specification

Column 1 at Line 24; the term "20101061099" should read -- 2010/061099 --.

Column 1 at Line 52; the term "vibrations." should read -- vibrations, --.

Column 2 at Line 13; the term "toumante" should read -- tournante --.

Column 3 at Line 63; the term "illus rated" should read -- illustrated --.

Column 4 at Line 5; the term "lines C." should read -- lines $\ell_i$ --.

Column 5 at Line 53; the term "drone)." should read -- drone), --.

Column 7 at Line 38; the term "$F'_1, F'_1$" should read -- $F'_1, F'_0$ --.

Signed and Sealed this
Eleventh Day of December, 2018

Andrei Iancu
*Director of the United States Patent and Trademark Office*